US012448965B2

(12) United States Patent
Wang et al.

(10) Patent No.: US 12,448,965 B2
(45) Date of Patent: *Oct. 21, 2025

(54) INTEGRATED ELECTRIC OIL PUMP AND OPERATION METHOD THEREOF

(71) Applicant: HANGZHOU QUADRANT TECHNOLOGY CO., LTD., Zhejiang (CN)

(72) Inventors: Liping Wang, Zhejiang (CN); Guojun Zhang, Zhejiang (CN); Ruinan Wang, Zhejiang (CN); Hezhao Hua, Zhejiang (CN); Yi Zhao, Zhejiang (CN); Zhixue Lu, Zhejiang (CN)

(73) Assignee: HANGZHOU QUADRANT TECHNOLOGY CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,947

(22) Filed: Aug. 13, 2024

(65) Prior Publication Data

US 2025/0059905 A1 Feb. 20, 2025

(30) Foreign Application Priority Data

Aug. 17, 2023 (CN) .......................... 202311034365.1
Nov. 29, 2023 (CN) .......................... 202311608228.4

(51) Int. Cl.
*F04C 2/10* (2006.01)
*F01P 3/00* (2006.01)
(Continued)

(52) U.S. Cl.
CPC ................ *F04C 2/102* (2013.01); *F01P 5/12* (2013.01); *F04C 2/10* (2013.01); *F04C 2/103* (2013.01);
(Continued)

(58) Field of Classification Search
CPC .............................. F04C 2/102; F04C 29/023
See application file for complete search history.

(56) References Cited

U.S. PATENT DOCUMENTS 7,614,227 B2   11/2009   Carlson et al.
8,376,720 B2   2/2013    Rosalik, Jr.
(Continued)

FOREIGN PATENT DOCUMENTS

CN      102953979 A      3/2013
JP      S58184377 U      12/1983
(Continued)

OTHER PUBLICATIONS

Non-Final Office Action received in corresponding U.S. Appl. No. 18/638,892, dated Jun. 7, 2024, 8 pages.
(Continued)

*Primary Examiner* — Kenneth J Hansen
(74) *Attorney, Agent, or Firm* — Cooper Legal Group, LLC

(57) ABSTRACT

An integrated electric oil pump and an operation method thereof are disclosed. The integrated oil pump includes a pump housing; an oil inlet; an oil outlet; a fixed shaft in the pump housing; an inner gear eccentrically and rotatably connected with the fixed shaft; an outer gear coaxially connected with the fixed shaft and rotatably arranged in the pump housing, the outer gear is located at an outer periphery of the inner gear and engaged with the inner gear; a motor rotor, the motor rotor is fixedly connected to an outer periphery of the outer gear; and a motor stator at an outer periphery of the rotor, the motor stator is fixedly connected with the pump housing; one end of the channel is in communication with the oil inlet, and an internal circulation of the cooling oil is achieved through the channel.

10 Claims, 9 Drawing Sheets

(51) Int. Cl.
  *F01P 5/12* (2006.01)
  *F04C 11/00* (2006.01)
  *F04C 29/02* (2006.01)
  *F04C 29/04* (2006.01)
  *H02K 9/19* (2006.01)

(52) U.S. Cl.
  CPC .......... *F04C 11/008* (2013.01); *F04C 29/023* (2013.01); *F04C 29/04* (2013.01); *H02K 9/19* (2013.01); *F01P 2003/006* (2013.01); *F01P 2005/125* (2013.01); *F04C 2240/30* (2013.01); *F04C 2240/40* (2013.01); *F04C 2240/50* (2013.01)

(56) References Cited

U.S. PATENT DOCUMENTS

| | | | |
|---|---|---|---|
| 11,959,481 | B2 | 4/2024 | Wang et al. |
| 2002/0136657 | A1 | 9/2002 | Ewald |
| 2005/0186089 | A1* | 8/2005 | Nakayoshi ............ F04C 15/008 417/355 |
| 2007/0231176 | A1* | 10/2007 | Asai ........................ F04C 2/102 418/61.2 |
| 2009/0175751 | A1 | 7/2009 | Nakayoshi |
| 2011/0129364 | A1* | 6/2011 | Yamamori ............. F04C 2/102 417/363 |
| 2011/0217192 | A1 | 9/2011 | Rosalik, Jr. |
| 2013/0052058 | A1 | 2/2013 | Motohashi et al. |
| 2014/0154125 | A1 | 6/2014 | Blechschmidt |
| 2023/0253853 | A1 | 8/2023 | Kim |
| 2023/0296094 | A1* | 9/2023 | Rosinski ............... F04D 29/588 417/213 |

FOREIGN PATENT DOCUMENTS

| | | | |
|---|---|---|---|
| JP | 02277983 | A | 11/1990 |
| JP | 2005273648 | A | 10/2005 |
| JP | 2006177291 | A | 7/2006 |
| JP | 2006336469 | A | 12/2006 |
| JP | 2007262943 | A | 10/2007 |
| JP | 2007262944 | A | 10/2007 |
| JP | 2007270678 | A | 10/2007 |
| JP | 2008057444 | A | 3/2008 |
| JP | 2009156081 | A | 7/2009 |
| JP | 2009162146 | A | 7/2009 |
| JP | 2013500430 | A | 1/2013 |
| JP | 2021508362 | A | 3/2021 |
| JP | 2022539958 | A | 9/2022 |
| JP | 2023502630 | A | 1/2023 |
| KR | 20230024800 | A | 2/2023 |

OTHER PUBLICATIONS

Office Action received in corresponding Japanese Patent Application No. 2024-137467, dated Nov. 12, 2024, 10 pages.
Non-Final Office Action received in corresponding U.S. Appl. No. 18/801,900, dated Dec. 20, 2024, 13 pages.
Final Office Action received in corresponding U.S. Appl. No. 18/801,900, dated Mar. 27, 2025, 13 pages.
Second Office Action received in corresponding Japanese Patent Application No. 2024-137466, dated Apr. 22, 2025, 14 pages.
Second Office Action received in corresponding Japanese Patent Application No. 2024-137467, dated Apr. 22, 2025, 16 pages.
First Office Action received in corresponding German Patent Application No. 10 2024 207 805.0, dated Apr. 29, 2025, 14 pages.
Third Office Action received in corresponding Japanese patent application No. 2024-096776, dated Sep. 2, 2025, 17 pages.

* cited by examiner

INTEGRATED ELECTRIC OIL PUMP AND OPERATION METHOD THEREOF

CROSS-REFERENCE TO RELATED APPLICATION

This application claims the priority to Chinese patent application serial no. 202311034365.1, filed on Aug. 17, 2023, and Chinese patent application serial no. 202311608228.4, filed on Nov. 29, 2023. The entireties of Chinese patent application serial no. 202311034365.1 and Chinese patent application serial no. 202311608228.4 are hereby incorporated by reference herein and made a part of this specification.

TECHNICAL FIELD

The present application relates to the technical field of electric oil pumps for new energy vehicles, and, in particular, to an integrated electric oil pump and an operation method thereof.

BACKGROUND ART

With the rapid development of automobile electronization and new energy vehicles, electric oil pumps, which have an integrated design and high precision, are increasingly used because of their high efficiency, energy conservation and flexible control.

At present, an electric oil pump mainly includes three parts: a gerotor, a motor, a controller and other components. The motor is controlled by the controller to work and drive the gerotor to rotate, so as to realize the operation of the electric oil pump.

However, conventional electric oil pumps have the disadvantages of complex structure and low circulation efficiency of cooling oil, and thus there is still room for improvement.

SUMMARY

In view of this, one object of the present application is to provide an integrated electric oil pump and an operation method thereof. The electric oil pump has the advantages of simple design, compact structure, high working efficiency and the like.

In a first aspect, the present application provides an integrated electric oil pump, including a pump housing, an oil inlet and an oil outlet, further including a fixed shaft in the pump housing, wherein a channel for cooling oil to pass through is defined in the fixed shaft; an inner gear eccentrically and rotatably connected with the fixed shaft; an outer gear coaxially connected with the fixed shaft and rotatably arranged in the pump housing, wherein the outer gear is positioned at an outer periphery of the inner gear and engaged with the inner gear; a motor rotor fixedly connected to an outer periphery of the outer gear; and a motor stator positioned at an outer periphery of the rotor, wherein the motor stator is fixedly connected with the pump housing; one end of the channel is in communication with the oil inlet, and an internal circulation of the cooling oil is achieved via the channel.

By adopting the technical solution described above, the outer gear is arranged inside and integrally formed with the motor rotor, thereby achieving a simpler and more compact structure. The channel in the fixed shaft may cool the fixed shaft when the cooling oil passes through the channel. Meanwhile, the cooling oil may connect the upper and lower spaces of the electric oil pump by virtue of the channel, so that the cooling oil flows in from the bottom of the channel to cool the inner gear, the outer gear, the motor rotor and the motor stator, thereby improving the circulation efficiency of the cooling oil.

In some embodiments of the first aspect, a projection area of the motor stator, a projection area of the motor rotor, a projection area of the outer gear, a projection area of the inner gear and a projection area of the fixed shaft on a plane through an axis of the fixed shaft at least partially overlap with each other.

By adopting the technical solution described above, the following technical effects may be achieved. Firstly, the height of the electric oil pump is reduced, such that the system size is significantly reduced, the system weight is decreased, and the material and production costs of the system are significantly reduced. Secondly, the height of the electric oil pump is reduced, the path of the pressurized cooling oil is shortened, which effectively reduces the friction with the gerotor chamber, thereby being conductive to improving the efficiency of the system. Thirdly, the structure is simple, which reduces the accumulated installation errors, such that the coaxiality of the motor rotor, the motor stator and the outer gear is improved, so as to effectively avoid the hidden danger of eccentric air gap. Fourthly, the structure is more stable, which effectively reduces the working vibration and noise of the pump body, thereby improving the performance and reliability of the pump body, and prolonging the service life of the pump body. Fifthly, such an extremely simple structural design effectively reduces the working vibration and noise of the pump, thereby improving the NVH (Noise, Vibration, Harshness) performance of the electric oil pump, and thus improving the reliability and service life of the oil pump.

In some embodiments of the first aspect, the electric oil pump further includes a bearing, one end of the fixed shaft is fixedly connected to the pump housing, and the fixed shaft is connected to the inner gear by virtue of the bearing.

By adopting the technical solution descried above, the bearing is arranged between the fixed shaft and the inner gear, so that the inner gear rotates more smoothly relative to the fixed shaft, and the accuracy and reliability of the assembly position of the inner gear relative to the fixed shaft may be improved.

In some embodiments of the first aspect, the outer gear is coupled with the pump housing by a bearing.

By adopting the technical solution described above, the stability of the outer gear during rotation may be improved, and the end clearance, the radial clearance of the electric oil pump and the air gap of the motor may be effectively improved, thereby significantly improving the performance and efficiency of the electric oil pump.

In some embodiments of the first aspect, the electric oil pump further includes an upper cover, two ends of the inner gear and two ends of the outer gear are respectively connected to the upper cover and the pump housing, and the inner gear, the outer gear, the upper cover and the pump housing jointly enclose an intake-expulsion chamber.

In some embodiments of the first aspect, the upper cover is defined with a through hole, and the channel is in communication with the intake-expulsion chamber through the through hole.

By adopting the technical solution described above, the inner gear rotates relative to the outer gear to circulate the cooling oil in the intake-expulsion chamber, and the channel is in communication with the intake-expulsion chamber by virtue of the through hole, so that the cooling oil circulates back and forth into or out of the intake-expulsion chamber. By this solution, the circulation efficiency of the cooling oil may be improved, thereby improving the cooling efficiency and lubrication efficiency of the electric oil pump.

In some embodiments of the first aspect, a plurality of intake-expulsion chambers are formed between the outer gear and the inner gear, a volume of the plurality of intake-expulsion chambers first increases gradually and then decreases gradually along a rotation direction of the outer gear. The pump housing is provided with the oil inlet and the oil outlet. When the volume of the plurality of intake-expulsion chambers increases gradually, an open end of the plurality of intake-expulsion chambers is aligned with the oil inlet, and when the volume of the plurality of intake-expulsion chambers decreases gradually, the open end of the plurality of intake-expulsion chambers is aligned with the oil outlet.

In some embodiments of the first aspect, when the volume of the plurality of intake-expulsion chambers increases gradually, the cooling oil flows into the plurality of intake-expulsion chambers through the oil inlet, and when the volume of the plurality of intake-expulsion chambers decreases gradually, the cooling oil in the plurality of intake-expulsion chambers is pressed out of the oil outlet.

In some embodiments of the first aspect, the channel is in communication with the oil inlet. When the volume of the plurality of intake-expulsion chambers increases gradually, the cooling oil flows into the plurality of intake-expulsion chambers through the channel and the through hole, and when the volume of the plurality of intake-expulsion chambers decreases gradually, the cooling oil in the plurality of intake-expulsion chambers is pressurized and flows into the channel from the through hole.

By adopting the technical solution described above, after the oil is sucked in by the oil inlet, a part of the oil flows directly into the through hole along the channel in the pressure environment formed by the rotation of the inner and outer gear which are eccentric with respect to each other. At the through hole, the pressure increases gradually and then decreases gradually along with the intake-expulsion chamber formed by the inner and outer gears which are eccentric with respect to each other, such that the cooling oil circulates back and forth into or out of the intake-expulsion chamber, so as to take the heat generated in the motor and the pump body away by the circulation of the cooling oil, and then the cooling oil flows out from the oil outlet. With the design of dual oil inlets, the circulation of the oil is accelerated and the circulation efficiency of the oil is significantly improved, thereby improving the cooling efficiency and lubrication efficiency of the electric oil pump in use.

In a second aspect, the present application provides an operation method of the integrated electric oil pump as described in the first aspect, including the following steps:
rotating the motor rotor and the outer gear to drive the inner gear to rotate;
pressurizing the cooling oil by the inner gear and the outer gear;
allowing a first part of the pressurized cooling oil to flow to the motor stator through the channel, and discharging a second part of the pressurized cooling oil out of the pump housing.

In a third aspect, the present application provides another operation method of the integrated electric oil pump as described in the first aspect, including the following steps:
rotating the motor rotor and the outer gear to drive the inner gear to rotate;
cyclically pressurizing and depressurizing the cooling oil by the inner gear and the outer gear in the intake-expulsion chamber;
as pressure of the cooling oil increases or decreases, allowing a first part of the cooling oil in the intake-expulsion chamber to flow into the channel via the through hole, or allowing the cooling oil flows into the intake-expulsion chamber from the channel via the through hole, so that heat in the pump housing is taken away by circulation of the cooling oil; and
discharging a second part of the cooling oil in the intake-expulsion chamber out of the oil outlet.

By adopting the technical solution described above, the design of dual oil paths can cool the pump itself while realizing the function of the pump, thereby improving the efficiency and life of the pump.

To sum up, the present application can achieve at least one of the following beneficial technical effects.

1. The height of the electric oil pump is reduced, such that the system size, the system weight and in turn the cost are reduced. The structure is simple, such that the assembly precision and the working efficiency are high, which extends the service life of the product. Since the electric oil pump of the present application presents a small aspect ratio, the structure of the pump body is more stable, and the axial and radial end clearances of the pump body are less affected by the thermal expansion of different materials caused by temperature, thereby improving the efficiency of the electric oil pump. By adopting the operation method of the electric oil pump described in the present application, the function of the pump is realized and the pump itself may also be cooled, thereby improving the efficiency and life of the pump.

2. In the electric oil pump of the present application, there are no bearings or nuts, no eccentric calibrator is used, the top of the shaft is directly inserted into the upper cover and fixed thereto while the bottom of the shaft is directly inserted into the bottom of the pump housing, and no connection or fixation of other parts is involved. This extremely simple and highly integrated structural design effectively avoids the machining errors by machining a plurality of parts and effectively reduces the tolerance accumulation generated during the assembly of the plurality of parts, thereby effectively improving the precision and the working efficiency of the electric oil pump.

3. This extremely simple and highly integrated structural design allows the enclosure, the shaft and pump gears to be highly and compactly integrated into a whole, which effectively improves the end clearance and radial clearance of the electric oil pump and the air gap of the motor, thereby significantly improving the performance and efficiency of the electric oil pump.

4. This extremely simple and highly integrated structure may effectively avoid the change of the end clearance and radial clearance of the pump body with temperature due to different thermal expansion coefficients of different materials of different parts (such as the enclosure, the shaft, the pump gears, etc.), which is very conductive to improving the precise structure of the electric oil pump.

5. This extremely simple and highly integrated structure design eliminates the need of multiple parts to reduce material cost and reduce production and assembling costs, thereby reducing the cost of the oil pump. Furthermore, this extremely simple structural design may effectively reduce the working vibration and noise of the pump and improve the NVH performance of the electric oil pump, thereby significantly improving the reliability and service life of the oil pump.

6. There are two oil inlets in this design. The lower oil inlet is similar to that in a conventional electric oil pump and is located at the bottom of the pump housing. The other one is an upper oil inlet which is located on the upper cover. By cooperating with the hollow shaft, this dual oil inlet design can realize the function of oil circulation. After the oil is taken in by the lower oil inlet, a part of the oil flows directly into the upper oil inlet along the hollow shaft in the pressure environment formed by the rotation of the inner and outer gear which are eccentric with respect to each other. The pressure increases gradually and then decreases gradually from the upper oil inlet along with the oil chamber formed by the inner and outer gear which are eccentric with respect to each other, such that the oil circulates back and forth into or out of the chamber, so as to take the heat generated in the motor and the pump body away with the circulation of the oil, and then the oil flows out from the oil outlet. With the design of dual oil inlets, the circulation of the oil is accelerated, and the circulation efficiency of the oil is significantly improved, thereby improving the cooling efficiency and lubrication efficiency during application of the electric oil pump.

DETAILED DESCRIPTION

Figure 1:
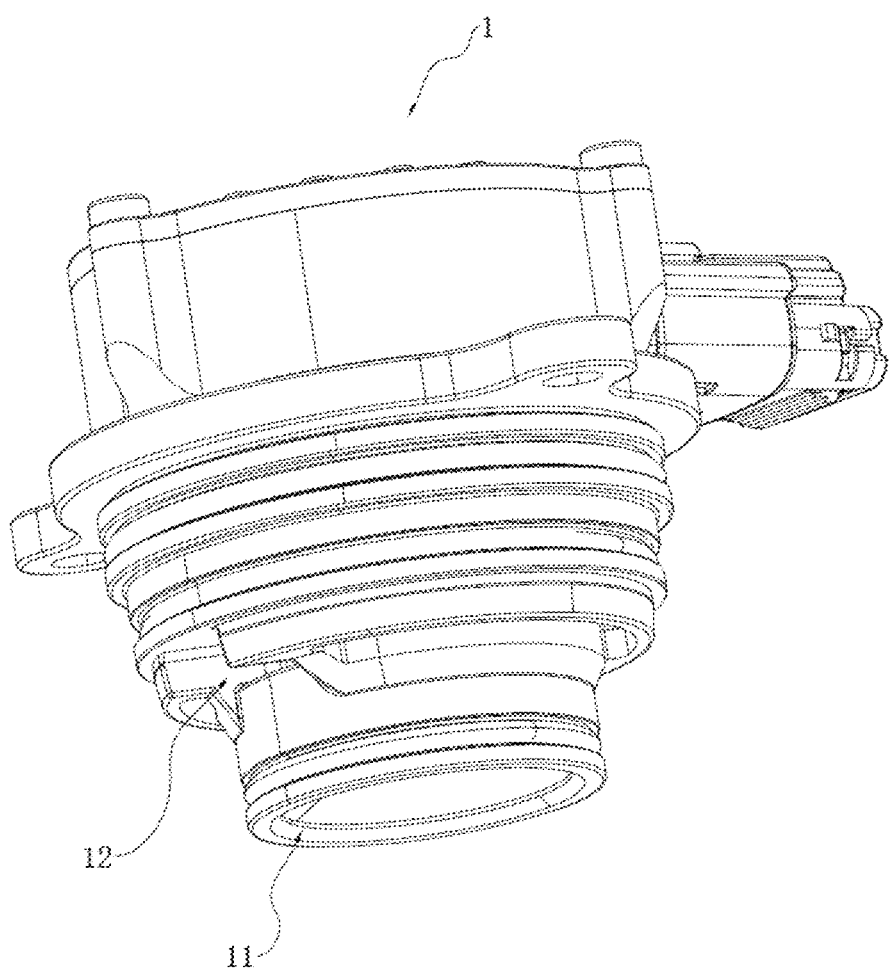
FIG. 1 is a schematic diagram showing the appearance structure of an integrated electric oil pump according to a first embodiment of the present application.

In order to make the object, technical solutions and advantages of the present application more clear, it will be described in detail below with reference to the accompanying drawings. The assemblies in embodiments of the present application, which are typically described and illustrated in the drawings herein, may be arranged and designed in a variety of different configurations. All other embodiments obtained by a person of ordinary skilled in the art based on the embodiments of the present disclosure without creative efforts shall fall within the protection scope of the present disclosure.

It should be noted that similar reference numerals and letters denote similar items in the following accompanying drawings, and therefore, once an item is defined in a drawing, it is not necessary to further define and explain it in the following accompanying drawings.

In the description of the present disclosure, it should be noted that, unless otherwise clearly specified and defined, the terms "install", "connecting", and "connected" should be understood in a broad sense, for example, it may be a fixed connection, a detachable connection, or an integral connection, it may be a mechanical connection or an electrical connection, and it may be a direct connection, an indirect connection through an intermediate medium, or an internal connection of two elements. For those skilled in the art, the specific meanings of the above terms in the present disclosure could be understood according to a specific condition.

In the description of the present disclosure, it should be understood that the orientation or position relationship indicated by the terms "upper", "lower", "left", "right", etc. are based on the orientation or position relationship shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

The embodiments of the present application will be described below in further detail with reference to the accompanying drawings. In the case of no conflict, the features in the following embodiments may be combined with each other.

First Embodiment

Referring to FIGS. 1-5, an integrated electric oil pump is provided.

Referring to FIG. 1, the integrated electric oil pump includes a pump housing 1, an oil inlet 11 and an oil outlet 12.

Figure 2:
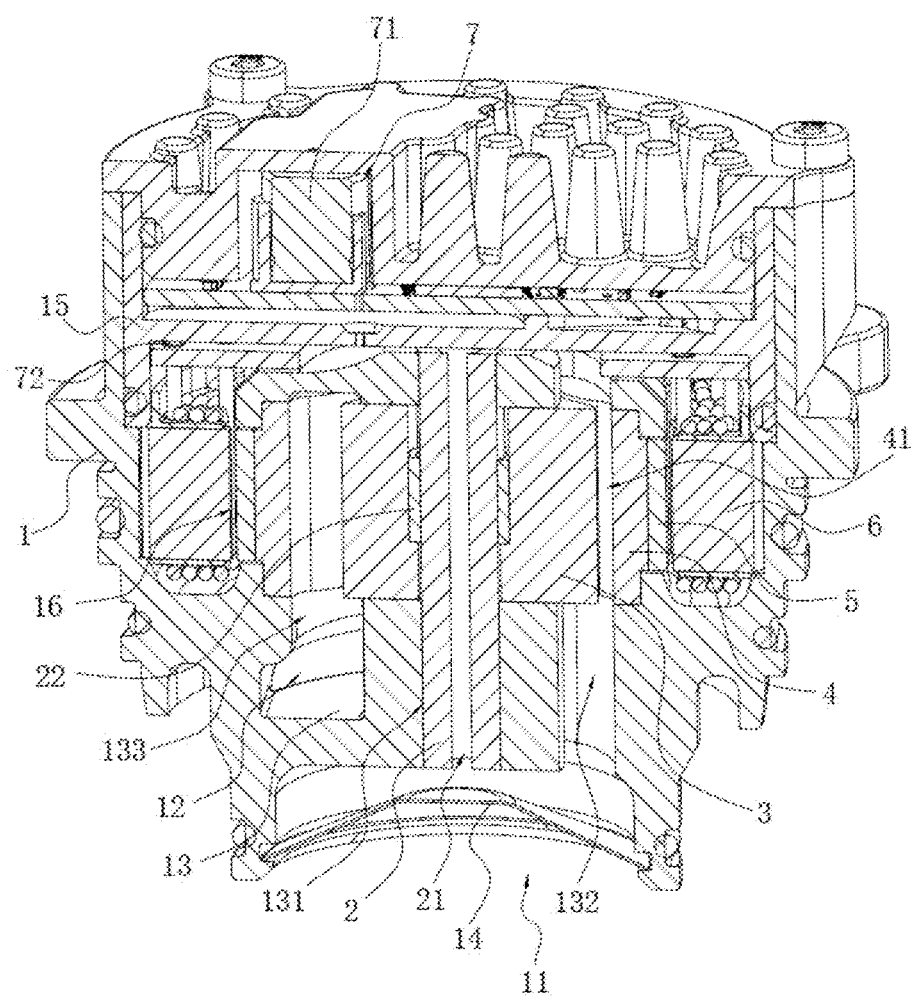
FIG. 2 is a schematic three-dimensional section view of the integrated electric oil pump according to the first embodiment of the present application.

Referring to FIG. 2, a circuit control module 7, a fixed shaft 2, an inner gear 3, an outer gear 4, a motor rotor 5 and a motor stator 6 are provided in the pump housing 1. The pump housing 1 is configured with a pressing hole 131, and the fixed shaft 2 is arranged in the pressing hole 131. The fixed shaft 2 is defined with an internal channel 21 for cooling oil, the inner gear 3 is eccentrically and rotatably connected to the fixed shaft 2, and a shaft sleeve 22 is connected between the fixed shaft 2 and the inner gear 3 to reduce the rotation resistance and improve the working stability. The outer gear 4 is coaxially connected to the fixed shaft 2 and rotatably connected in the pump housing 1, the outer gear 4 is located at an outer periphery of the inner gear 3 and engaged with the inner gear 3. One end of the channel 21 is connected with the oil inlet 11, and the cooling oil may be internally circulated via the channel 21. The motor rotor 5 is fixedly connected to an outer periphery of the outer gear 4, the motor stator 6 is located at an outer periphery of the motor rotor and fixedly connected to the pump housing 1, and an air gap 16 is formed between the motor rotor 5 and the motor stator.

A filter screen 14 is connected to one end of the oil inlet 11 to filter the cooling oil. The cooling oil enters the intake-expulsion chamber 41 between the inner gear 3 and the outer gear 4 from an intake mouth 132 through the filter screen 14, and then is discharged from the oil outlet 12 at the bottom of the pump housing 1.

The circuit control module 7 includes a hub 72 positioned above the motor in the pump housing 1 and a controller 71 positioned above the hub 72. The function of the hub 72 is to collect the incoming and outgoing lines of the stator coils 61, so that the line ends are distributed orderly and clearly, and the line ends are welded on the hub 72 by a simple and clean process. Another function of the hub 72 is to separate the controller 71 from the motor part, so that the oil only circulates in the motor part to form a cooling and lubrication loop, thereby preventing the oil from entering the controller 71.

The hub 72 is arranged above the stator assembly. Pins of the stator coils 61 are inserted in the hub 72, thereby simplifying the design of the electric control module and thus conventional winding structure.

The controller 71 may allow a fast response, providing the advantages of circuit reverse connection protection, prevention of signal interference, monitoring of oil temperature, prevention of overheating, independent communication channels, detection of the angular position of the motor, reception and calculation of the motor speed, and rational comparison and adjustment of the actual rotor speed.

The outer gear is integrated in the motor rotor and the thermal expansion coefficients of the motor stator 6 and the pump body are identical, which greatly reduces the influence of temperature on the clearances of the oil pump, so as to precisely ensure the end clearance of the pump, such that the influence of temperature on the flow efficiency of the system is effectively reduced or avoided.

During operation, the circuit control module 7 controls a plurality of stator coils 61 to be powered on, and then a magnetic field generated interacts with the permanent magnetic field of a magnet of the motor rotor 5, to drive the motor rotor 5 to rotate. The motor rotor 5 is fixed to the outer gear 4, that is, the motor stator 6 and the magnet of the motor rotor 5 interact with each other, to drive the outer gear 4 to rotate, and the outer gear 4 in turn drives the inner gear 3 to rotate, thus realizing the relative rotation of the inner gear 3 relative to the outer gear 4.

The pump housing 1 is provided with an enclosure 15 for separating the controller 71 from the hub 72. With the enclosure 15, the oil paths may be separated from the electric control part, thereby improving the sealing effect and ensuring the work of the controller 71 at a suitable temperature. A PTC temperature sensor 82 (not shown) for detecting and feeding back the temperature of the cooling oil is installed on the enclosure 15 and electrically connected to the controller 71. In this embodiment, the detection of the PTC temperature sensor 82 may be accurate to 0.1° C.

In particular, projection areas of the motor stator 6, of the motor rotor, of the outer gear 4, of the inner gear 3 and of the fixed shaft 2 on a plane through the axis of the fixed shaft 2 at least partially overlap. Therefore, the technical solution of the present application is different from the series connection between the motor and the pump in the traditional electric oil pump. The technical solution of the present application has more compact structure, shorter oil path and higher efficiency and is greatly improved in the installation convenience, working reliability and working efficiency.

Figure 3:
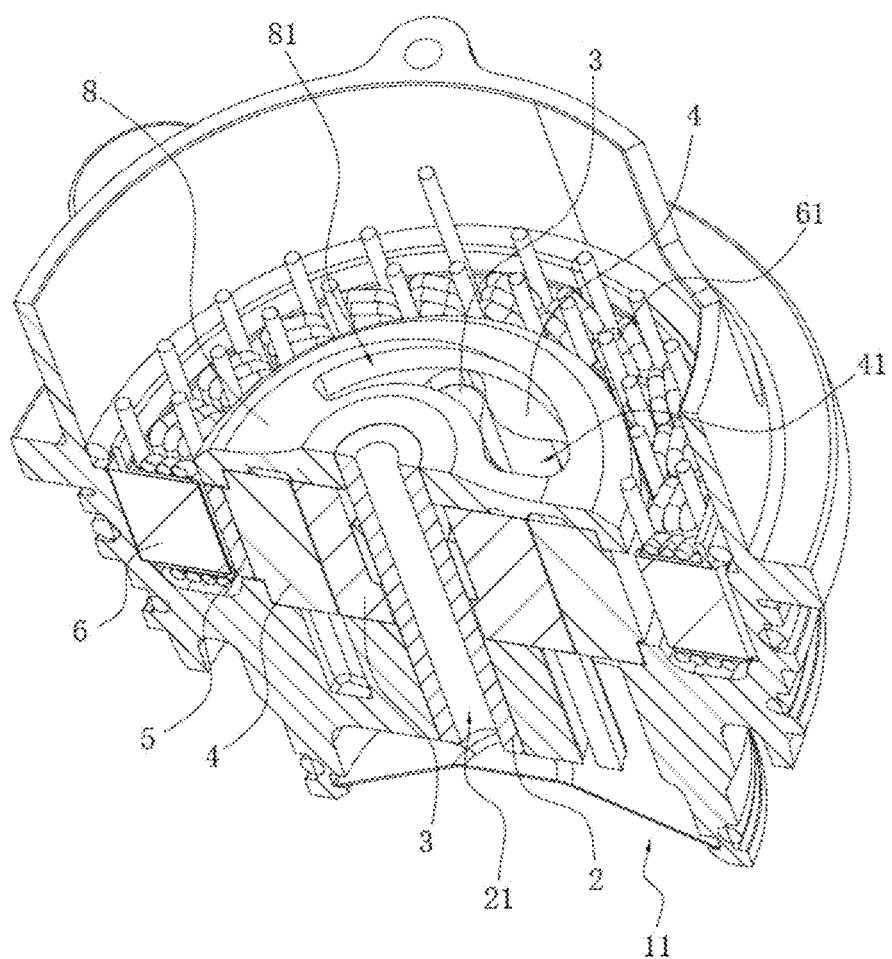
FIG. 3 is a sectional view showing the internal structure of the integrated electric oil pump according to the first embodiment of the present application viewed from above.
Figure 4:
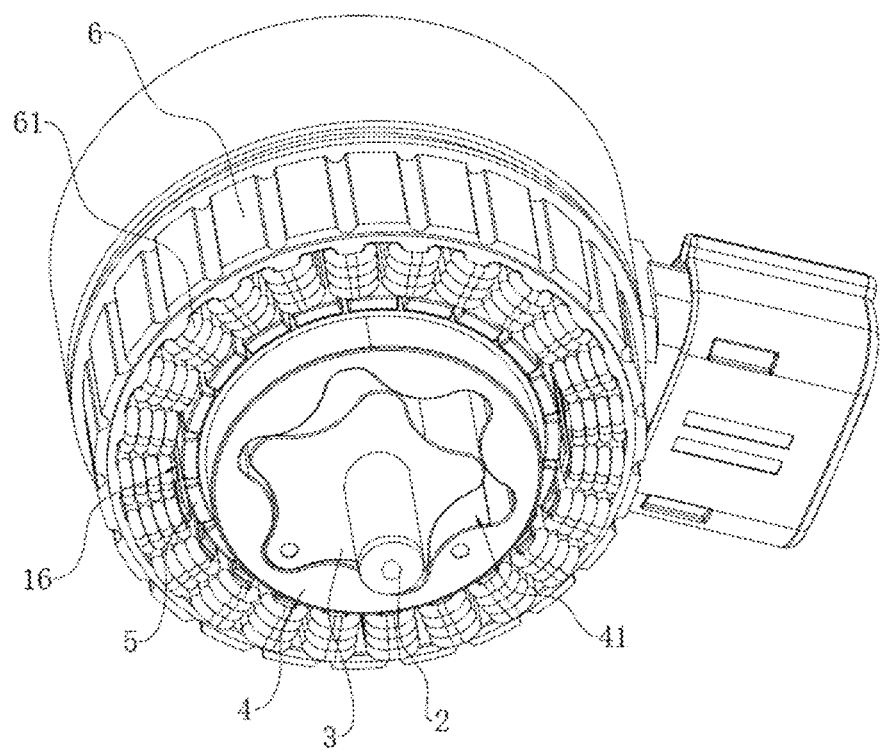
FIG. 4 is a schematic diagram showing the internal structure of the integrated electric oil pump according to the first embodiment of the present application viewed from below.

Referring to FIGS. 3 and 4, the motor stator 6 is provided with a plurality of stator coils 61 along a circumferential direction thereof. The motor rotor 5 is sleeved on an outer circumference of the outer gear 4. The circumferential outer wall of the motor rotor 5 corresponds to the circumferential inner wall of the motor stator 6. An upper cover 8 is further connected to the fixed shaft 2. Two ends of the inner gear 3 and two ends of the outer gear 4 are respectively connected to the upper cover 8 and the pump housing 1, which jointly enclose a plurality of intake-expulsion chambers 41. The volume of the intake-expulsion chambers 41 first increases gradually and then decreases gradually along a rotation direction of the outer gear 4. A through hole 81 is formed in the upper cover 8 to connect the intake-expulsion chambers 41. The channel 21 may guide the cooling oil from the oil inlet 11 into the intake-expulsion chambers 41 between the inner gear 3 and the outer gear 4 through the through hole 81, thereby improving the cooling and lubrication efficiency. The channel 21 may further guide the cooling oil from the oil inlet 11 into the motor stator 6, the motor rotor 5 and other components to cool these components, thereby realizing multiple internal circulations and improving the cooling efficiency.

Figure 5:
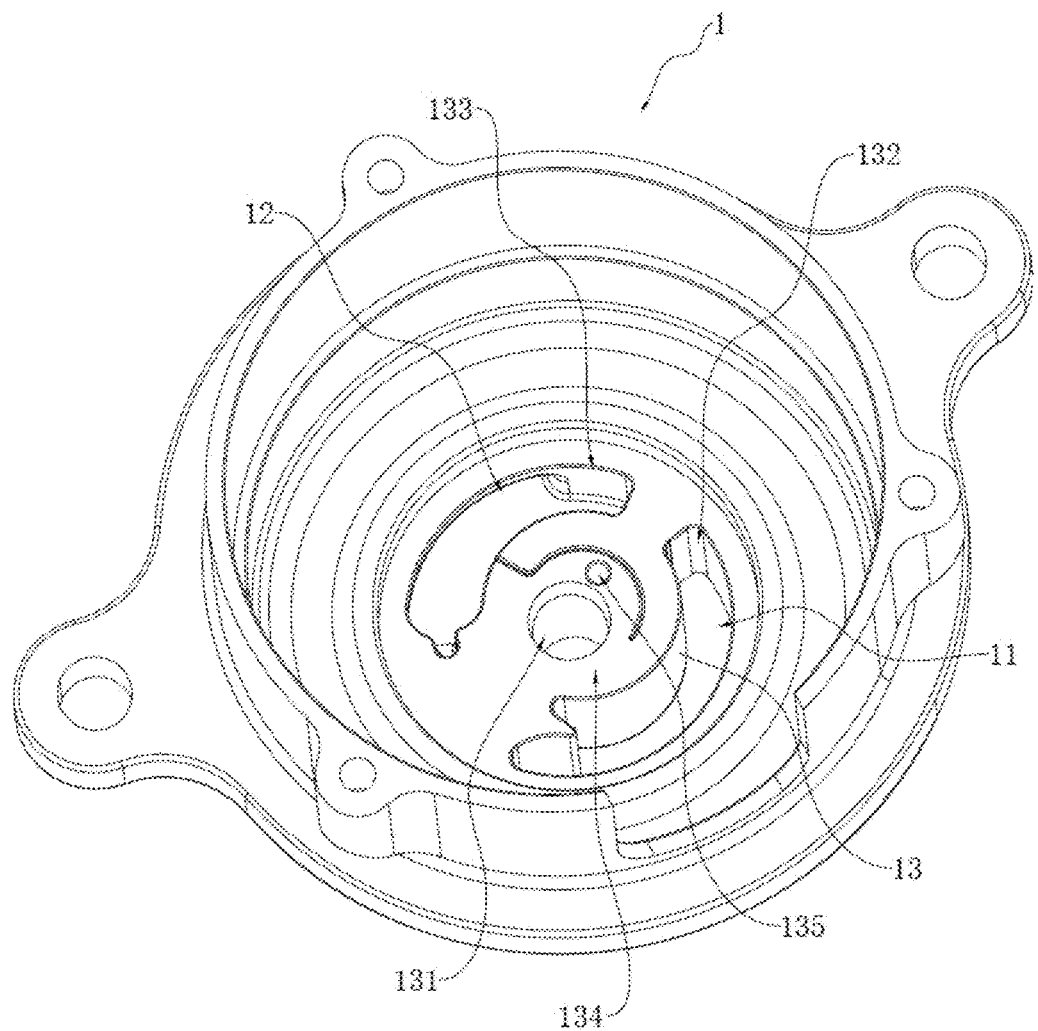
FIG. 5 is a schematic diagram showing the structure of a bottom of a pump housing of the integrated electric oil pump according to the first embodiment of the present application.

Referring to FIG. 4 and FIG. 5, the oil inlet 11 is integrally formed at the bottom of the pump housing 1, and the oil outlet 12 is integrally formed in the circumferential outer wall of the pump housing 1. The bottom of the pump housing 1 is integrally provided with a base to cover the oil inlet 11 and the oil outlet 12, and an end surface of the base is axially configured with the pressing hole 131 fixedly connected to one end of the fixed shaft 2. The fixed shaft 2 is inserted into the pressing hole 131, and a circumferential outer wall of the fixed shaft 2 is in tight fit with a hole wall of the pressing hole 131. The end surface of the base is configured with an intake mouth 132 in communication with the oil inlet 11 and an oil outtake 133 in communication with the oil outlet 12. In addition to the intake mouth 132 and the oil outtake 133, a partition 134 for separating the intake mouth 132 from the oil outtake 133 is formed at the base, and one side of the partition 134 abuts against one side of the inner gear 3, to improve the sealing effect between the intake mouth 132 and the oil outtake 133.

When the volume of the intake-expulsion chambers 41 increases gradually, negative pressure is formed, such that the intake-expulsion chambers 41 are aligned with the oil inlet 11, therefore, the cooling oil flows into the intake-expulsion chambers 41 through the oil inlet 11. When the volume of the intake-expulsion chambers 41 decreases gradually, the pressure increases, such that the intake-expulsion chambers 41 are aligned with the oil outlet 12, therefore, the cooling oil in the intake-expulsion chambers 41 is pressed out of the oil outlet 12.

The mechanism for cooling the stator assembly by the cooling oil in this embodiment is as follows.

The motor rotor 5 and the outer gear 4 jointly drive the inner gear 3 to rotate to pressurize the cooling oil from the oil inlet 11, so that one part of the pressurized cooling oil flows to the stator assembly through the channel 21 of the fixed shaft 2, to cool the stator assembly, while the cooling oil that undergoes heat exchange then flows back to the low-pressure area.

In addition, the other part of the pressurized cooling oil is directly discharged from the oil outlet 12 through a high-pressure area.

The specific process of cooling the stator assembly of the present application is as follows.

1) Firstly, the device is powered on. At this time, the controller 71 is powered on and converts electricity into three-phase electricity to power the stator coils 61. The electromagnetic force drives the motor rotor 5 and the outer gear 4 to rotate. The motor rotor 5 and the outer gear 4 rotate so that the cooling oil from the oil inlet 11 enters the low-pressure area through the filter screen 14.

2) The motor rotor 5 and the outer gear 4 jointly drive the inner gear 3 to rotate around the fixed shaft 2 to pressurize the cooling oil flowing from the oil inlet 11, so that one part of the pressurized cooling oil flows to the stator assembly through the fixed shaft 2 to cool the stator assembly, the cooling oil that undergoes heat exchange then flows back to the low-pressure area, and the cooling oil is pressurized by a pressure difference caused by the eccentric arrangement of the inner gear 3 relative to the outer gear 4. At this time, the PTC temperature sensor 82 detects the current temperature value of the oil and feeds the temperature value back to the controller 71, and the controller 71 then feeds the current temperature value of the oil back to an external control system.

3) The other part of the pressurized cooling oil is directly discharged out of the oil outlet 12 through the high-pressure area.

Since the height of the whole electric oil pump is reduced, it takes a shorter time than a traditional electric oil pump for the pressurized cooling oil in this embodiment to flow to the stator assembly, thereby achieving a better cooling effect. In this embodiment, the motor stator 6 is made of a silicon steel sheet, thereby reducing manufacturing cost and decreasing the friction of rotary parts. Compared with the traditional electric oil pump in which the stator coils has a wire diameter of 1.6 mm, the gerotor in this embodiment, in which the stator coils 61 has a wire diameter of 1.8 mm, is greatly improved in terms of performance.

An O-ring is further provided at an outer periphery of the pump housing 1. In this embodiment, the O-ring is made of rubber. The O-ring is used for allowing horizontal and axial deformation, which is conductive to sealing to reduce oil leakage and to form high pressure. This design is cost-effective and efficient, easy to assemble, has a long service life, and is easy to maintain.

The Second Embodiment

Figure 6:
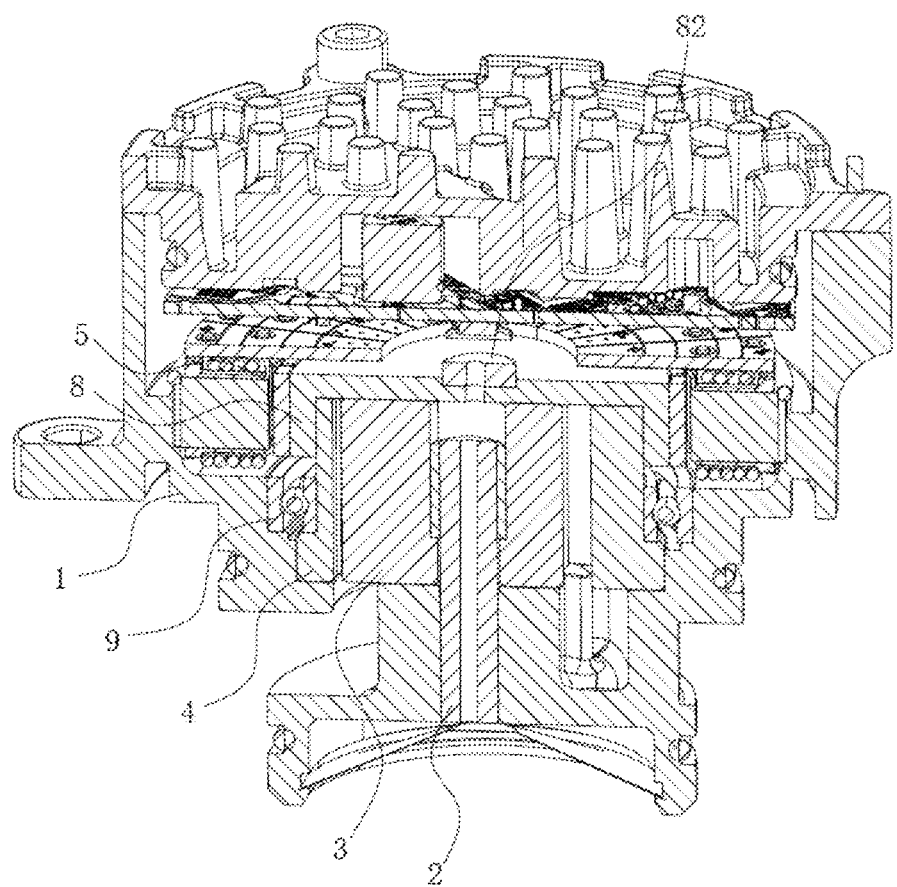
FIG. 6 is a schematic three-dimensional cross section of an integrated electric oil pump according to a second embodiment of the present application.

Referring to FIG. 6, this embodiment is different from the first embodiment in that a ball bearing 9 is provided between the outer gear 4 and the pump housing 1 to improve the rotary stability of the outer gear 4. For the cold start of the high-power electric oil pump, the top of the upper cover 8 fixedly connected to the outer gear 4 is further fixedly connected with a sensor 82 in this embodiment. In this embodiment, the sensor 82 is configured as a magnetic transformer. In other specific applications, the sensor 82 may also be fixedly connected to a top of the fixed shaft 2.

Compared with the traditional electric oil pump in which the motor rotor 5 is pressed in the bracket of a ball bearing 9 and then the ball bearing 9 and pump gears are pressed in, the present application is not provided with a bracket of the ball bearing 9. In this way, the height of the whole electric oil pump is shortened on the one hand, such that the path and in turn the necessary time for the pressurized cooling oil to flow to the stator assembly is short, thereby achieving a better cooling effect. On the other hand, the accumulated installation errors are avoided, and there will be no hidden dangers of air gap eccentricity.

The Third Embodiment

Figure 7:
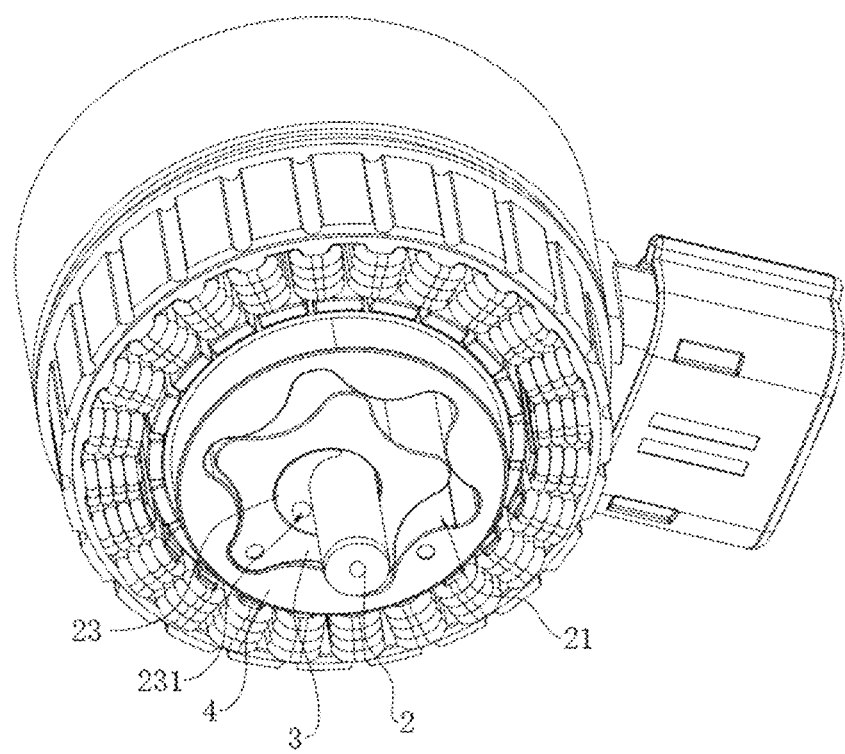
FIG. 7 is a schematic diagram showing the internal structure of an integrated electric oil pump according to a third embodiment of the present application viewed from below.
Figure 8:
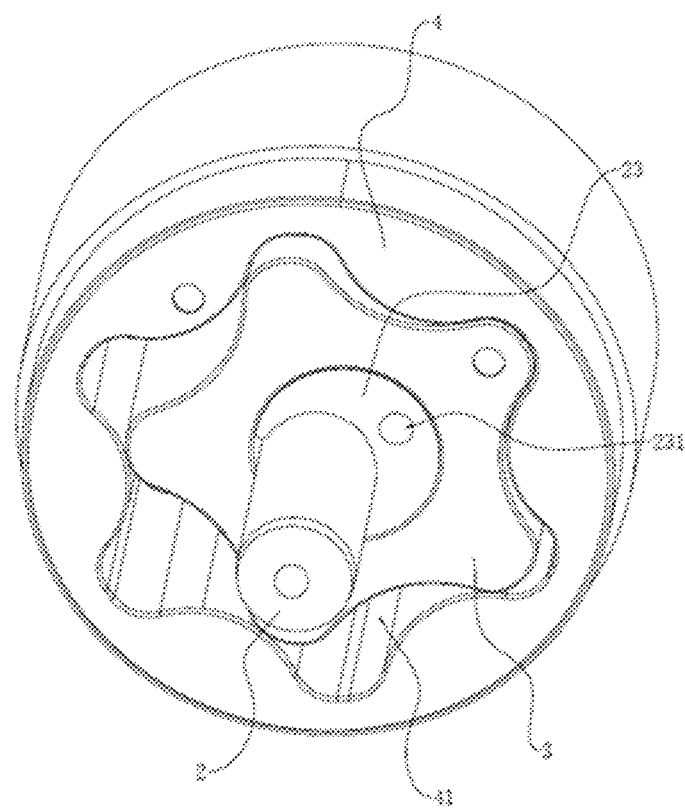
FIG. 8 is a schematic diagram showing an assembled eccentric calibrator in an integrated electric oil pump according to the third embodiment of the present application.
Figure 9:
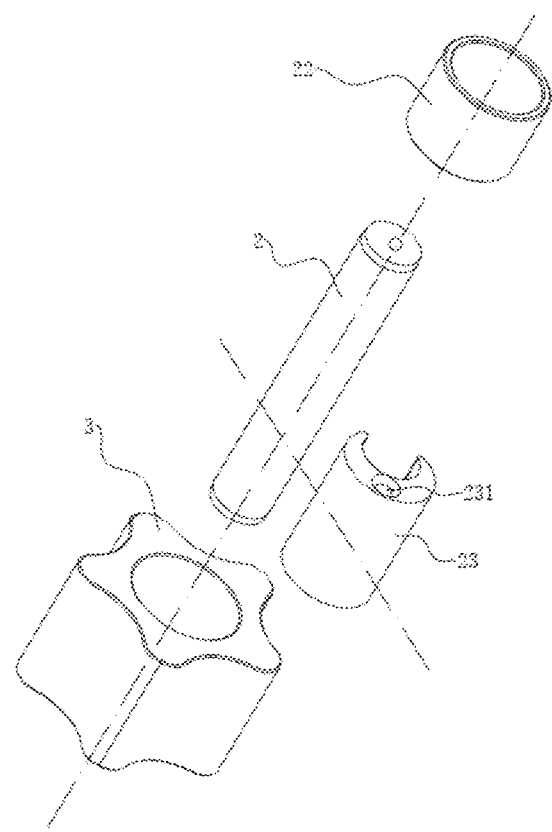
FIG. 9 is a schematic exploded view showing the assembling relationship of a fixed shaft and an inner gear in the integrated electric oil pump according to the third embodiment of the present application.

Referring to FIGS. 7-9, this embodiment differs from the first and second embodiments in that an eccentric calibrator 23 for realizing eccentricity between the inner gear 3 and the fixed shaft 2 is provided between the fixed shaft 2 and the inner gear 3. The eccentric calibrator 23 in this embodiment is configured as a crescent sleeve by which the inner gear 3 can be accurately positioned eccentrically relative to the fixed shaft 2. A shaft sleeve 22 is provided between the fixed shaft 2 and the inner gear 3 to reduce sliding friction.

A location hole 231 is formed at one side of the crescent sleeve and penetrates through the crescent sleeve, and a guide hole for assembly 135 corresponding to the location hole 231 is formed in the base. Since the guide hole for assembly 135 is eccentrically arranged relative to the pressing hole 131 (see FIG. 5), the crescent sleeve may also be rotatably connected to the inner gear 3 while the outer gear 4 is rotatably connected to the fixed shaft 2, so that the inner gear 3 and the outer gear 4 may rotate coaxially and eccentrically. During the relative rotation of the inner gear 3 relative to the outer gear 4, the volume of the plurality of intake-expulsion chambers 41 between the inner gear 3 and the outer gear 4 changes, which brings about a pressure change, thereby realizing the circulation of the cooling oil.

The Fourth Embodiment

This embodiment discloses a operation method of an electric oil pump, which is applicable to the electric oil pump in the embodiments described above and includes the following steps:
  rotating the motor rotor 5 and the outer gear 4 to drive the inner gear 3 to rotate;
  pressurizing the cooling oil by the inner gear 3 and the outer gear 4; and
  allowing a part of the pressurized cooling oil to flow toward the motor stator 6 through the channel 21, while discharging the other part of the pressurized cooling oil out of the pump housing 1.

The Fifth Embodiment

This embodiment discloses another operation method of an electric oil pump, which is applicable to the electric oil pump in the first to third embodiments and includes the following steps:
  rotating the motor rotor 5 and the outer gear 4 to drive the inner gear 3 to rotate;
  cyclically pressurizing and depressurizing the cooling oil by the inner gear 3 and the outer gear 4 in the intake-expulsion chambers 41;
  as the pressure of the cooling oil increases or decreases, allowing a part of the cooling oil in the intake-expulsion chambers 41 to flow into the channel 21 through the through hole 81, or allowing the cooling oil to flow into the intake-expulsion chambers 41 from the channel 21 through the through hole 81, such that heat in the pump housing 1 is taken away by the cooling oil circulation, and
  discharging the other part of the cooling oil in the intake-expulsion chambers 41 out of the oil outlet 12.

The above shows and describes the basic principles, main features and advantages of the present invention. Those skilled in the industry should understand that the present application is not limited by the embodiments described above. The described embodiments and description only illustrate the principles of the present application. Without departing from the spirit and scope of the present disclosure, the present application may also be subject to various changes, modifications, substitutions and variations, all of which fall within the scope of the present disclosure as claimed.

LIST OF REFERENCE SIGNS

1 Pump Housing
11 Oil Inlet
12 Oil Outlet
13 Bottom Of Pump Housing
131 Pressing Hole
132 Intake Mouth
133 Oil Outtake
134 Partition
135 Guide Hole For Assembly
14 Filter Screen
15 Enclosure
16 Air Gap
2 Fixed Shaft
21 Channel
22 Shaft Sleeve
23 Eccentric Calibrator
231 Location Hole
3 Inner Gear
4 Outer Gear
41 Intake-Expulsion Chamber
5 Motor Rotor
6 Motor Stator
61 Stator Coils
7 Circuit Control Module
71 Controller
72 Hub
8 Upper Cover
81 Through Hole
82 Sensor
9 Ball Bearing

What is claimed is:

1. An integrated electric oil pump, comprising a pump housing, an oil inlet and an oil outlet, and further comprising:
   a fixed shaft provided in the pump housing, wherein a channel for cooling oil to pass through is defined in the fixed shaft;
   an inner gear eccentrically and rotatably connected with the fixed shaft;
   an outer gear coaxially connected with the fixed shaft and rotatably arranged in the pump housing, wherein the outer gear is located at an outer periphery of the inner gear and engaged with the inner gear;
   a motor rotor fixedly connected to an outer periphery of the outer gear; and
   a motor stator positioned at an outer periphery of the motor rotor and fixedly connected with the pump housing;
   wherein one end of the channel is in communication with the oil inlet, and an internal circulation of the cooling oil is achieved via the channel,
   wherein an eccentric calibrator for realizing eccentricity between the inner gear and the fixed shaft is provided between the fixed shaft and the inner gear,
   wherein the oil outlet is integrally formed in a circumferential outer wall of the pump housing, and
   wherein a bottom of the pump housing is integrally provided with a base to cover the oil inlet and the oil outlet, an end surface of the base is axially configured with a pressing hole fixedly connected to one end of the fixed shaft, a location hole is formed at one side of the eccentric calibrator and penetrates through the eccentric calibrator, a guide hole for assembly corresponding to the location hole is formed in the base, and the guide hole for assembly is eccentrically arranged relative to the pressing hole.

2. The integrated electric oil pump according to claim 1, wherein a projection area of the motor stator, a projection area of the motor rotor, a projection area of the outer gear, a projection area of the inner gear and a projection area of the fixed shaft on a plane through an axis of the fixed shaft at least partially overlap with each other.

3. The integrated electric oil pump according to claim 1, wherein the outer gear is coupled with the pump housing by a bearing.

4. The integrated electric oil pump according to claim 1, further comprising an upper cover, wherein two ends of the inner gear and two ends of the outer gear are respectively connected to the upper cover and the pump housing, and the inner gear, the outer gear, the upper cover and the pump housing jointly enclose an intake-expulsion chamber.

5. The integrated electric oil pump according to claim 4, wherein the upper cover is defined with a through hole, and the channel is in communication with the intake-expulsion chamber through the through hole.

6. The integrated electric oil pump according to claim 5, wherein a plurality of intake-expulsion chambers are formed between the outer gear and the inner gear, a volume of the plurality of intake-expulsion chambers first increases gradually and then decreases gradually along a rotation direction of the outer gear, and the pump housing is provided with the oil inlet and the oil outlet, when the volume of the plurality of intake-expulsion chambers increases gradually, an open end of the plurality of intake-expulsion chambers is aligned with the oil inlet, and when the volume of the plurality of intake-expulsion chambers decreases gradually, the open end of the plurality of intake-expulsion chambers is aligned with the oil outlet.

7. The integrated electric oil pump according to claim 6, wherein when the volume of the plurality of intake-expulsion chambers increases gradually, the cooling oil flows into the plurality of intake-expulsion chambers through the oil inlet, and when the volume of the plurality of intake-expulsion chambers decreases gradually, the cooling oil in the plurality of intake-expulsion chambers is pressed out of the oil outlet.

8. The integrated electric oil pump according to claim 6, wherein the channel is in communication with the oil inlet, when the volume of the plurality of intake-expulsion chambers increases gradually, the cooling oil flows into the plurality of intake-expulsion chambers through the channel and the through hole, and when the volume of the plurality of intake-expulsion chambers decreases gradually, the cooling oil in the plurality of intake-expulsion chambers is pressurized and flows into the channel from the through hole.

9. An operation method of the integrated electric oil pump according to claim 1, comprising the following steps:
   rotating the motor rotor and the outer gear to drive the inner gear to rotate;
   pressurizing the cooling oil by the inner gear and the outer gear to obtain pressurized cooling oil; and
   allowing a first part of the pressurized cooling oil to flow to the motor stator through the channel, and discharging a second part of the pressurized cooling oil out of the pump housing.

10. An operation method of the integrated electric oil pump according to claim 6, comprising the following steps:

rotating the motor rotor and the outer gear to drive the inner gear to rotate;

cyclically pressurizing and depressurizing the cooling oil in the plurality of intake-expulsion chambers by the inner gear and the outer gear;

as a pressure of the cooling oil increases or decreases, allowing a first part of the cooling oil in the plurality of intake-expulsion chambers to flow into the channel via the through hole, or allowing the cooling oil to flow into the plurality of intake-expulsion chambers from the channel via the through hole, so that heat in the pump housing is taken away by circulation of the cooling oil; and discharging a second part of the cooling oil in the plurality of intake-expulsion chambers out of the oil outlet.

* * * * *